Patented Nov. 5, 1929

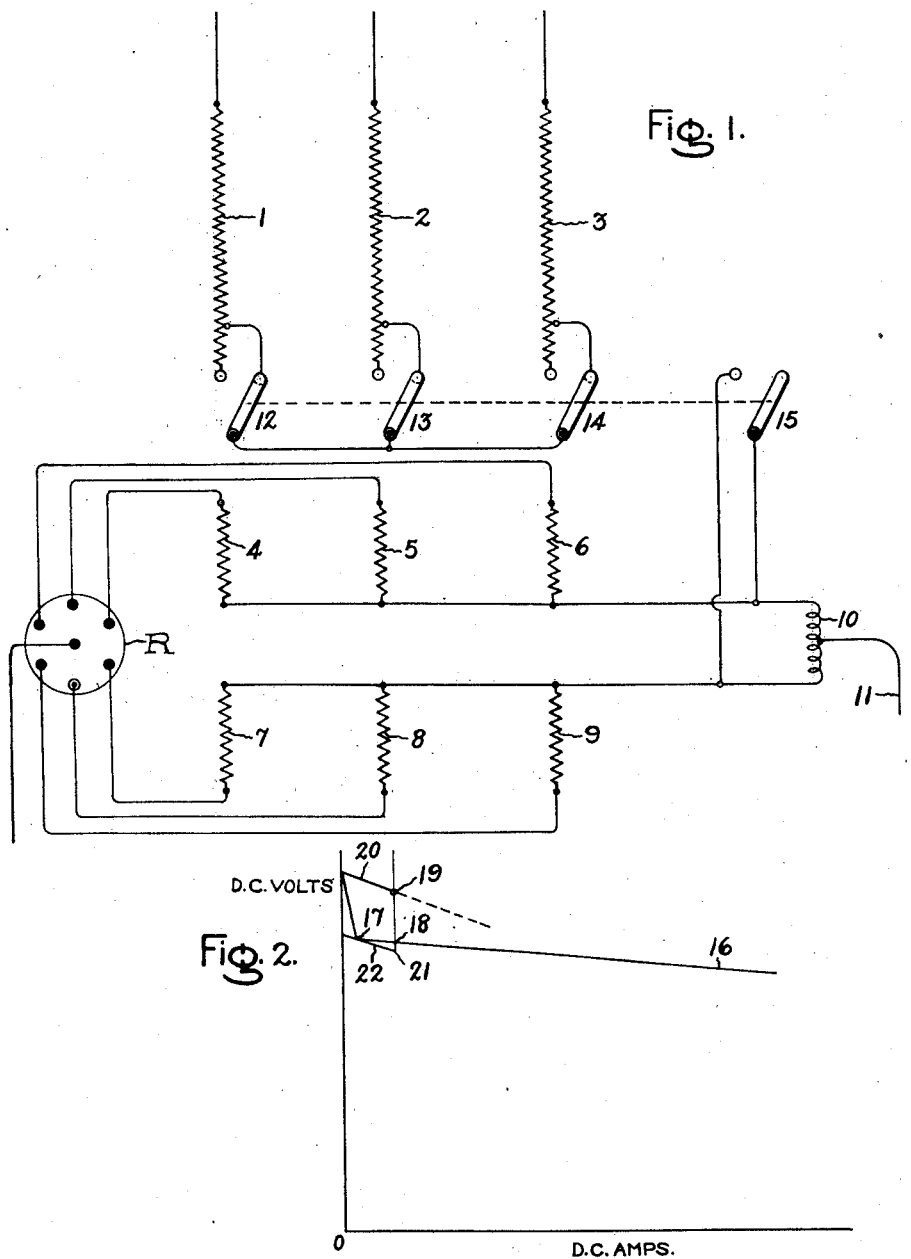

1,734,915

UNITED STATES PATENT OFFICE

JOHN C. READ, OF RUGBY, ENGLAND, ASSIGNOR TO GENERAL ELECTRIC COMPANY, A CORPORATION OF NEW YORK

MERCURY ARC RECTIFIER SYSTEM

Application filed August 28, 1928, Serial No. 302,571, and in Great Britain September 15, 1927.

My invention relates to connections for electric arc rectifiers, and more particularly to connections for automatically preventing a rise of the rectified voltage at no-load.

In the operation of such rectifiers, in which the rectifier is supplied with current of a large number of phases, it is known that for many purposes the type of secondary winding of the transformer supplying the rectifier which gives best results, is a star connection of the appropriate number of phases, in which this star is divided into a number of similar symmetrical star-connected systems or groups whose individual neutral points are connected together through one or more interphase transformers to form the main neutral point which is the negative pole of the D. C. system supplied by the rectifier.

Many types of such interphase transformers are known, but all of them have the common feature that they produce a rapid rise of the rectified voltage from light load to no-load. due to the fact that at very small loads the current flowing through the interphase transformer is not sufficient to produce the required voltage across it. This rise of voltage at no-load is sometimes objectionable, and various means have been taken to prevent it, such as employing less advantageous transformer connections in which the interphase transformer is not used, or connecting a load resistance by hand or automatically across the rectifier when the useful load on the latter drops low, so that the total current output of the rectifier never falls below the critical value at which its voltage would start to rise sharply. The first of these methods involves a more costly transformer and other disadvantages; the second entails a considerable waste of power. The object of the present invention is to prevent this rise of voltage in a way which does not involve these objections and actually saves power.

The novel features which I consider characteristic of my invention are pointed out in the appended claims. The invention itself however, will best be understood by reference to the accompanying drawing in which Fig. 1 illustrates diagrammatically a system of connections according to the invention, as applied to one typical form of interphase transformers, and Fig. 2 illustrates the results obtained.

In Fig. 1, 1, 2 and 3 represent the three primary phases of the transformer supplying the rectifier R, and 4, 5, 6, 7, 8 and 9 represent the six secondary phases, which are divided into two similar symmetrical 3-phase star-connected systems, whose neutral points are connected together through the interphase transformer 10, to form the main star-point 11, and whose free ends are respectively connected to the anodes of rectifier R. This is a well-known system of connections for large electric arc rectifiers. Switches 12, 13 and 14, which are all operated together, are capable of switching in an increased number of turns in the phases of the primary winding. An additional switch 15 is operated with 12, 13 and 14, so that when the latter switch in the extra turns in the primary phases switch 15 will simultaneously short-circuit the interphase transformer.

In Fig. 2, 16 is the type of volt-ampere characteristic normally obtained with transformer connections as in Fig. 1, having a sharp rise of D. C. voltage from the point 17 to no load. The operation of the switches in Fig. 1 is however as follows: at some small load indicated by the point 18, slightly in excess of the critical load at the point 17 where the knee of the curve 16 occurs, the switches 12, 13, 14 and 15 are changed over by hand or automatically from the right hand position to the left hand position in Fig. 1. The effect of short-circuiting the interphase transformer would be to increase the D. C. voltage from the point 18 to the point 19, the volt-ampere characteristic being then that given by the line 20; the proof of this fact is well-known. But the simultaneous changing over of switches 12, 13 and 14 alters the transformer ratio and thereby the actual change of voltage is not from 18 to 19 but from 18 to 21; the actual amount of change from 18 to 21 can of course be adjusted by the choice of the number of extra turns switched in by the changing over of switches 12, 13 and 14. The D. C. volt-ampere characteristic is consequently given by curve 16 down to the load at which the switches are thrown over, and from that point to no load by the curve 22. Consequently this arrangement enables a nearly constant voltage to be obtained even down to no load.

The extra turns which are switched in on the transformer primary windings are seen to be only in circuit at light loads and consequently are inexpensive since they have not to be designed to carry any large current. Also, the switching in or the additional turns reduces the flux density in the transformer core, and thereby reduces the standby losses of the equipment considerably during the periods of light load.

Switches 12, 13 and 14 must be so arranged that they are capable of changing from the one position to the other without interrupting the primary current and without dead-short-circuiting any part of the primary winding. Many ways of effecting this are known, and this feature has therefore been omitted from Fig. 1 for simplicity.

Exactly similar arrangements may be used with any other type of interphase transformer or interphase transformers, the feature being that in all cases the various star points which are normally held apart by the interphase transformer are short-circuited together by switches and the number of effective turns in the primary phases simultaneously increased.

What I claim as new and desire to secure by Letters Patent of the United States, is:—

1. The method of preventing a rise of the direct current voltage at no-load in a mercury arc rectifier system including a power transformer provided with secondary windings separated into groups and connected to the anodes of the rectifier and an interphase transformer connected between said groups, which consists in short-circuiting the interphase transformer at a predetermined load and simultaneously decreasing the voltage impressed upon said anodes.

2. The method of preventing a rise of the direct current voltage at no load in a mercury arc rectifier system including a power transformer provided with secondary windings separated into groups and connected to the anodes of the rectifier and an interphase transformer connected between said groups, which consists in short-circuiting the interphase transformer at a predetermined load and simultaneously changing the ratio of said power transformer.

3. The method of preventing a rise of the direct current voltage at no-load in a mercury arc rectifier system including a power transformer provided with secondary windings separated into groups and connected to the anodes of the rectifier and an interphase transformer connected between said groups, which consists in short-circuiting the interphase transformer at a predetermined load and simultaneously increasing the number of turns in the primary winding of said power transformer.

4. In a rectifying system the combination of a rectifier, a power transformer provided with secondary windings arranged in groups and connected to the anodes of said rectifier, an interphase transformer connected between said groups, and means for short-circuiting said interphase transformer and simultaneously decreasing the voltage induced in said secondary winding.

5. In a rectifying system the combination of a mercury arc rectifier, a power transformer provided with secondary windings arranged in groups and connected to the anodes of said rectifier, an interphase transformer connected between said groups, and means for short-circuiting said interphase transformer and simultaneously changing the ratio of said power transformer.

6. In a rectifying system the combination of a mercury arc rectifier, a power transformer provided with secondary windings arranged in groups and connected to the anodes of said rectifier, an interphase transformer connected between said groups, and means for short-circuiting said interphase transformer and simultaneously increasing the number of turns in the primary winding of said power transformer.

In witness whereof, I have hereunto set my hand this 27th day of August, 1928.

JOHN C. READ.